(12) United States Patent
Kim et al.

(10) Patent No.: US 12,497,069 B2
(45) Date of Patent: *Dec. 16, 2025

(54) AUTONOMOUS DRIVING DEVICE AND DRIVING CONTROL METHOD THEREOF

(71) Applicants: Hyundai Motor Company, Seoul (KR); Kia Corporation, Seoul (KR)

(72) Inventors: Ga Hee Kim, Seoul (KR); Yun Sub Kim, Suwon-Si (KR); Hwan Hee Lee, Gunpo-Si (KR); Seung Yong Lee, Uiwang-Si (KR)

( * ) Notice: Subject to any disclaimer, the term of this patent is extended or adjusted under 35 U.S.C. 154(b) by 244 days.

This patent is subject to a terminal disclaimer.

(21) Appl. No.: 18/509,875

(22) Filed: Nov. 15, 2023

(65) Prior Publication Data

US 2024/0351609 A1    Oct. 24, 2024

(30) Foreign Application Priority Data

Apr. 13, 2023    (KR) ........................ 10-2023-0048902

(51) Int. Cl.
*B60W 60/00* (2020.01)
(52) U.S. Cl.
CPC ..... *B60W 60/001* (2020.02); *B60W 2420/403* (2013.01); *B60W 2420/408* (2024.01); *B60W 2530/201* (2020.02); *B60W 2720/10* (2013.01)
(58) Field of Classification Search
CPC ........ G06V 20/52; G06V 20/54; G06V 20/56; G06V 20/58; G06V 20/588; G06V 2201/08; B60W 30/08; B60W 30/09; B60W 30/095; B60W 30/0953; B60W 30/143; B60W 30/18154; B60W 30/18159; B60W 40/02; B60W 40/10; B60W 2050/0002; B60W 2050/0005; B60W 60/001; B60W 60/0015; B60W 60/0018; B60W 60/00186;
(Continued)

(56) References Cited

U.S. PATENT DOCUMENTS 8,924,068 B2   12/2014   Shitamoto et al.
9,020,682 B2    4/2015   Shitamoto et al.
(Continued)

FOREIGN PATENT DOCUMENTS

JP    2008-083995 A    4/2008
JP    2018-67281 A     4/2018
KR    10-2013-0044859 A  5/2013

*Primary Examiner* — Brandon Z Willis
(74) *Attorney, Agent, or Firm* — Banner & Witcoff, Ltd.

(57) ABSTRACT

An autonomous driving device and a driving control method thereof are provided. The autonomous driving device includes at least one sensor, a processor, and storage including a database. The processor is configured to detect, using the at least one sensor, an obstacle that is present on a passage in a first driving path, of the first autonomous driving device, to a destination; determine whether there is a need for the first autonomous driving device to cross paths with the obstacle to pass through the passage; determine a time to collision by the first autonomous driving device with the obstacle; determine whether the obstacle is a second autonomous driving device; identify a driving rule corresponding to the second autonomous driving device; determine, based on the driving rule, a second driving path for passing through the passage; and control the first autonomous driving device to drive on the passage along the second driving path.

20 Claims, 7 Drawing Sheets

(58) Field of Classification Search
CPC ....... B60W 60/0027; B60W 2420/403; B60W 2420/408; B60W 2530/201; B60W 2552/50; B60W 2555/60; B60W 2554/40; B60W 2554/402; B60W 2554/4045; B60W 2556/45; B60W 2556/65; B60W 2720/10; B60W 2756/10; G08G 1/017; G08G 1/16; G08G 1/162; G08G 1/166; G05D 1/0212; G05D 1/0214; G05D 1/617; G05D 1/619; G05D 1/622; G05D 1/633

See application file for complete search history.

(56) References Cited

U.S. PATENT DOCUMENTS

| | | | |
|---|---|---|---|
| 9,229,450 B2 | 1/2016 | Oshima et al. | |
| 10,019,299 B2 | 7/2018 | Park et al. | |
| 11,577,719 B2 * | 2/2023 | Tanahashi | G05D 1/0214 |
| 2018/0107532 A1 | 4/2018 | Park et al. | |
| 2019/0243371 A1 * | 8/2019 | Nister | B60W 30/095 |
| 2019/0263393 A1 * | 8/2019 | Han | G05D 1/0055 |
| 2021/0114218 A1 * | 4/2021 | Kim | B25J 9/1651 |
| 2021/0382491 A1 | 12/2021 | Murotani et al. | |
| 2022/0227367 A1 * | 7/2022 | Kario | G06V 40/103 |

\* cited by examiner

ND DRIVING CONTROL METHOD THEREOF

AUTONOMOUS DRIVING DEVICE AND DRIVING CONTROL METHOD THEREOF

CROSS-REFERENCE TO RELATED APPLICATION

This application claims the benefit of priority to Korean Patent Application No. 10-2023-0048902, filed in the Korean Intellectual Property Office on Apr. 13, 2023, the entire content of which is incorporated herein by reference.

TECHNICAL FIELD

The present disclosure relates to an autonomous driving device and a driving control method thereof, and more particularly, relates to pathfinding in an autonomous driving device.

BACKGROUND

An autonomous driving device (e.g., an autonomous mobile robot) refers to a device which searches its surroundings, detects obstacles, selects a path, and travels along the path using wheels or legs to reach a destination. Autonomous driving devices have been deployed in various environments. As an example, an autonomous driving device may move to a specified destination in a specified place (e.g., a specific building or a specific place) and provide various services (e.g., a delivery service). The autonomous driving device may determine a path for moving to the destination based on information about the specified place and may move to the destination along the determined path to provide a service.

However, when the autonomous driving device drives on a narrow passage and when a fixed (e.g., stationary) obstacle is detected on a movement path (or a driving path) of the autonomous driving device, or an external autonomous driving device (e.g., another autonomous driving device) is detected, the autonomous driving device may not be able to pass through the passage along the initially determined movement path, and the autonomous driving device may be required to drive across the external autonomous driving device's driving path.

SUMMARY

The present disclosure has been made to solve the above-mentioned problems occurring in the prior art while advantages achieved by the prior art are maintained intact.

An aspect of the present disclosure provides an autonomous driving device for determining a path for avoiding an obstacle to move to a destination based on the obstacle and a situation, after detecting the obstacle on a movement path, and a driving control method thereof.

Another aspect of the present disclosure provides an autonomous driving device for correcting a movement path (e.g., a passage) to perform cross driving with an autonomously movable object detected, after detecting the autonomously movable obstacle on the movement path, and performing cross driving with the obstacle along the corrected movement path and a driving control method thereof.

The technical problems to be solved by the present disclosure are not limited to the aforementioned problems, and any other technical problems not mentioned herein will be clearly understood from the following description by those skilled in the art to which the present disclosure pertains.

According to one or more example embodiments of the present disclosure, a first autonomous driving device may include: at least one sensor; a processor; and storage comprising a database. The database may store information about a plurality of autonomous driving devices. The processor may be configured to: detect, using the at least one sensor, an obstacle that is present on a passage in a first driving path, of the first autonomous driving device, to a destination; determine whether there is a need for the first autonomous driving device to cross paths with the obstacle to pass through the passage; determine, based on the need, a time to collision by the first autonomous driving device with the obstacle; determine, based on a determination that the time to collision is less than a threshold time, whether the obstacle is a second autonomous driving device associated with the information stored in the database; identify, based on the obstacle being the second autonomous driving device associated with the information, a driving rule corresponding to the second autonomous driving device, the driving rule being stored in the storage; determine, based on the driving rule, a second driving path for passing through the passage; and control the first autonomous driving device to drive on the passage along the second driving path.

The at least one sensor may include at least one of: an image sensor or a light detection and ranging (LiDAR) sensor.

The driving rule may include one or more criteria for determining an autonomous driving device to drive along the passage and an autonomous driving device to move to an edge of the passage, based on at least one of: a width of the passage, a size of each of the first autonomous driving device and the second autonomous driving device, a sensor configuration, or a measurement range of a sensor.

The information about the plurality of autonomous driving devices may include at least one of: identification information about each of the plurality of autonomous driving devices, manufacturer information about each of the plurality of autonomous driving devices, size information about the plurality of autonomous driving devices, information about a configuration of a sensor included in each of the plurality of autonomous driving devices, or information about a measurement range of a predetermined sensor.

The processor may be configured to determine whether the obstacle is the second autonomous driving device by: analyzing an image corresponding to the obstacle, the image being obtained using the at least one sensor; and determining, based on the analyzed image, whether the obstacle is the second autonomous driving device.

The processor may be further configured to: determine, using the at least one sensor, whether there is a person around the obstacle, based on the obstacle not being the second autonomous driving device associated with the information stored in the database; output, based on the person being around the obstacle, an alert to notify that the obstacle is present; determine a third driving path following one edge of the passage; and control the first autonomous driving device to drive on the passage along the third driving path.

The processor may be further configured to, based on a determination that no person is around the obstacle, determine a fourth driving path which does not include the passage and control the first autonomous driving device to drive along the fourth driving path.

The processor may be further configured to: determine, based on a size and a position of the obstacle, a width of an unobstructed space on the passage at a location where the first autonomous driving device is expected to cross paths with the obstacle; maintain a driving speed of the first autonomous driving device at a predetermined first speed, based on the width of the unobstructed space being greater than a first reference value; decrease the driving speed of the first autonomous driving device to a second predetermined speed lower than the predetermined first speed, based on the width of the unobstructed space being less than or equal to the first reference value and is greater than a second reference value; and determine another driving path that does not pass through the passage, based on the width of the unobstructed space being less than or equal to the second reference value.

The processor may be further configured to determine the first reference value and the second reference value based on information about a size of the first autonomous driving device and a measurement range of the at least one sensor.

The first autonomous driving device may further include a communication circuit. The processor may be further configured to: receive, from an external device associated with the first autonomous driving device and through the communication circuit, the information about the plurality of autonomous driving devices or information about an additional autonomous and update the database and the driving rule based on the information about the plurality of autonomous driving devices or the information about the additional autonomous driving device.

The processor may be further configured to transmit, through the communication circuit, a message indicating that it is impossible to pass through the passage due to the obstacle or that it is unable to find a path for reaching the destination.

According to one or more example embodiments of the present disclosure, a driving control method may include: detecting, using at least one sensor of a first autonomous driving device, an obstacle that is present on a passage in a first driving path, of the first autonomous driving device, to a destination; determine whether there is a need for the first autonomous driving device to cross paths with the obstacle to pass through the passage; determining, based on the need, a time to collision by the first autonomous driving device with the obstacle; determining, based on a determination that the time to collision is less than a threshold time, whether the obstacle is a second autonomous driving device associated with information, about a plurality of autonomous driving devices, stored in a database; identifying, based on the obstacle being the second autonomous driving device associated with the information, a driving rule corresponding to the second autonomous driving device, the driving rule being stored in storage of the first autonomous driving device; determining, based on the driving rule, a second driving path for passing through the passage; and controlling the first autonomous driving device to drive on the passage along the second driving path.

The driving rule may include one or more criteria for determining an autonomous driving device to drive along the passage and an autonomous driving device to move to an edge of the passage, based on at least one of: a width of the passage, a size of each of the first autonomous driving device and the second autonomous driving device, a sensor configuration, or a measurement range of a sensor.

The information about the plurality of autonomous driving devices may include at least one of: identification information about each of the plurality of autonomous driving devices, manufacturer information about each of the plurality of autonomous driving devices, size information about each of the plurality of autonomous driving devices, information about a configuration of a sensor included in each of the plurality of autonomous driving devices, or information about a measurement range of a predetermined sensor.

Determining whether the obstacle is the second autonomous driving device may include: analyzing an image corresponding to the obstacle, the image being obtained using the at least one sensor; and determining, based on the analyzed image, whether the obstacle is the second autonomous driving device.

The driving control method may further include: determining, using the at least one sensor, whether there is a person around the obstacle, based on the obstacle being not the second autonomous driving device associated with the information stored in the database; outputting, based on the person being around the obstacle, an alert to notify that the obstacle is present; determining a third driving path following one edge of the passage; and controlling the first autonomous driving device to drive on the passage along the third driving path.

The driving control method may further include: determining, using the at least one sensor, whether there is a person around the obstacle, based on the obstacle being not the second autonomous driving device associated with the information stored in the database; based on a determination that no person is around the obstacle, determining a fourth driving path which does not include the passage; and controlling the first autonomous driving device to drive along the fourth driving path.

The driving control method may further include: determining, based on a size and a position of the obstacle, a width of an unobstructed space on the passage at a location where the first autonomous driving device is expected to cross paths with the obstacle; and performing one of: maintaining a driving speed of the first autonomous driving device at a predetermined first speed, based on the width of the unobstructed space being greater than a first reference value; decreasing the driving speed of the first autonomous driving device to a second predetermined speed lower than the first predetermined speed, based on the width of the unobstructed space being less than or equal to the first reference value and is greater than a second reference value; or determining another driving path that does not pass through the passage, based on the width of the unobstructed space being less than or equal to the second reference value.

The driving control method may further include: determining the first reference value and the second reference value based on information about a size of the first autonomous driving device and a measurement range of the at least one sensor.

The driving control method may further include: receiving, from an external device associated with the first autonomous driving device, the information about the plurality of autonomous driving devices or information about an additional autonomous driving device; and updating the database and the driving rule based on the information about the plurality of autonomous driving devices or the information about the additional autonomous driving device.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
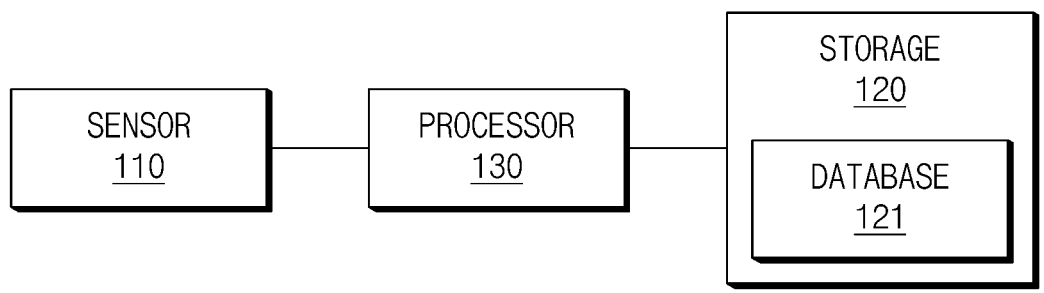
FIG. 1 is a block diagram of an autonomous driving device.

Hereinafter, one or more example embodiments of the present disclosure will be described in detail with reference to the accompanying drawings. In adding the reference numerals to the components of each drawing, it should be noted that the identical component is designated by the identical numerals even when they are displayed on other drawings. Further, in describing the one or more example embodiment of the present disclosure, a detailed description of well-known features or functions will be ruled out in order not to unnecessarily obscure the gist of the present disclosure.

In describing the components of the example embodiment according to the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein have the same meaning as being generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, one or more example embodiments of the present disclosure will be described in detail with reference to FIGS. 1 to 7.

FIG. 1 is a block diagram of an autonomous driving device.

An autonomous driving device 100 may include at least one sensor 110, storage 120, and a processor 130.

The at least one sensor 110 may include an image sensor 110 (e.g., a camera) and a light detection and ranging (LiDAR) sensor 110. For example, the image sensor 110 may generate an image by capturing the outside of the autonomous driving device 100. For example, the image sensor 110 may capture an image including an external obstacle. For example, the LiDAR sensor 110 may obtain information about an external object of the autonomous driving device 100 (e.g., at least one of a building, a structure, a person, an external device (e.g., another autonomous mobile robot), or an external object, or any combination thereof).

For example, each of the at least one sensor 110 may have a predetermined margin value. For example, the margin value of the at least one sensor 110 may indicate a reference distance at which the at least one sensor 110 is able to obtain information about the external object. In other words, the margin value may be a minimum measurement distance (e.g., a measurement range) of the sensor. For example, each of the at least one sensor 110 may have a blind spot and may have a range where it is able to sense the external object. For example, when the sensor 110 is present at a distance closer than the margin value from the external object, it may fail to obtain suitable data for recognizing the external object. For example, the autonomous driving device 100 may require a space greater than or equal to the margin value of the sensor 110 to recognize the external object and smoothly perform autonomous driving. For example, the autonomous driving device 100 may detect a forward obstacle in a space wider than a value obtained by adding the margin value of the sensor 110 to a size (or a width) of the body of the autonomous driving device 100 and may avoid the obstacle to drive.

The at least one sensor 110 included in the autonomous driving device 100 is not limited to the image sensor 110 and the LiDAR sensor 110, which may include various other sensors 110 (e.g., an ultrasonic sensor 110, a radar sensor 110, an infrared (IR) sensor 110, an acceleration sensor 110, a gyro sensor 110, a position sensor 110 (e.g., a global positioning system (GPS)), and/or a proximity sensor 110).

The storage 120 may include a database (DB) 121 including information associated with each of a plurality of autonomous driving devices 100. For example, the information associated with each of the plurality of autonomous driving devices 100 may include identification information (e.g., a model name) of each of the plurality of autonomous driving devices 100, manufacturer information of each of the plurality of autonomous driving devices 100, size information of each of the plurality of autonomous driving devices 100 (e.g., a height and a width of an autonomous mobile robot), a configuration of the sensor 110 (e.g., a 2D camera, a 3D camera, a 2D LiDAR sensor 110, or a 3D LiDAR sensor 110) included in the autonomous mobile robot, a margin setting value of the sensor 110, and/or information about a supported interaction type (e.g., text to speech (TTS), a display, or conversation). For example, the margin setting value of the sensor 110 may indicate a minimum distance at which the sensor 110 is able to recognize an external situation of the autonomous mobile robot. For example, the storage 120 may store information associated with at least one external device (e.g., another autonomous mobile robot).

For example, Table 1 below indicates an example of information of the autonomous driving device 100, which is stored in the storage 120.

TABLE 1

| Identification information (model name) | Manufacturer | Device size, sensor configuration, and sensor margin (unit: mm) | Interaction |
| --- | --- | --- | --- |
| HR0001 | H company | {width: 500, height: 1000, sensors: [{3D LiDAR, (0, −300, 0), margin: 200}, {3D LiDAR, (0, 300, 0), margin: 200}, 3D camera, (0, 0.500), margin: 10}] | TTS, display, conversation |

TABLE 1-continued

| Identification information (model name) | Manufacturer | Device size, sensor configuration, and sensor margin (unit: mm) | Interaction |
| --- | --- | --- | --- |
| HR0002 | H company | {width: 400~600, height: 800~1000, sensors: [{3D LiDAR, (0, −300, 0), margin: 200}, {3D LiDAR, (0, 300, 0), margin: 200}, 3D camera. (0, 0.500), margin: 10}] | TTS |

For example, the identification information may indicate a model number of the autonomous driving device 100, and the manufacturer may indicate an enterprise which manufactures or sells the autonomous driving device 100.

For example, the size of the autonomous driving device 100 may include width and height information of the autonomous driving device 100. The size of the autonomous driving device 100 may include numerical values of a three-dimensional (3D) length, width, and height as well as the width and the height. For example, when it is possible to change the appearance of the autonomous driving device 100, the size of the autonomous driving device 100 may indicate a changeable size range. For example, for HR0002, that the width is 400 to 600 and the height is 800 to 1000 may mean that the width and height of the HR0002 autonomous driving device 100 is variable. As another example, when the appearance of the autonomous driving device 100 is not constant according to the height (e.g., when the autonomous driving device 100 is not simply in the form of a cube or cylinder and has a different width depending on the height), the size of the autonomous driving device 100 may include information corresponding to the appearance.

For example, the configuration of the sensor 110 and the margin information of the sensor 110 may include a type of each of the at least one sensor 110 included in the autonomous driving device 100, a position of each of the at least one sensor 110, and margin information of each of the at least one sensor 110. For example, when [{3D LiDAR, (0, −300, 0), margin: 200}, {3D LiDAR, (0, 300, 0), margin: 200}, 3D camera, (0, 0. 500), margin: 10}], it is shown that the autonomous driving device 100 includes two 3D LiDAR sensors 110 and includes one 3D camera. The position of each of the at least one sensor 110 may be represented as a coordinate form (e.g., a coordinate value of (a longitudinal direction-a direction identical to a driving direction, a width direction-a direction orthogonal to the driving direction, a height direction)) on the basis of one point (e.g., a front center or a front center floor) of the autonomous driving device 100. When the 3D LiDAR sensors 110 have position information of (0, −300, 0) and position information of (0, 300, 0), respectively, it may be shown that the 3D LiDAR sensors 110 are arranged in opposite directions in a width direction of the autonomous driving device 100 (e.g., from the center of the 300 nm positions left and right autonomous driving device 100), respectively. For example, when the 3D camera has position information of (0, 0, 500), it is shown that the 3D camera is disposed at a height of 500 mm in the front center of the autonomous driving device 100. For example, the margin of each of the at least one sensor 110 may indicate a sensing start range (i.e., a sensible range) of each of the at least one sensor 110. For example, that the margin of the 3D LiDAR sensor 110 is 200 mm may indicate that the 3D LIDAR sensor 110 is able to sense and identify an external object from a range away by 0.2 m. For example, referring to HR0001 in Table 1 above, a margin of each of the two 3D LiDAR sensors 110 is 0.2 m at a width of 0.6 m for HR0001. Thus, safe driving may be ensured on a road having a width greater than or equal to 1.0 m (=0.6 m+0.2 m+0.2 m) for HR0001. For example, assuming that HR0001 drives using only the one LiDAR sensor 100, it may be possible for HR0001 to drive on a road having a width greater than or equal to 0.8 m (=0.6 m+0.2 m). When HR0001 decelerates to a general speed or less to drive at the general speed or less, safe driving may be ensured on a road having a width greater than or equal to 0.8 m. For example, when driving on a passage having a width of 0.8 m, HR0001 may be close to one edge of the passage (e.g., an edge in a right direction of HR0001) and may drive on the passage at a decelerated speed while using only the LiDAR sensor 110 in an opposite direction (e.g., a left direction of HR0001). Hereinafter, a width (e.g., 1.0 m) including both of margins of the sensor 110 in both directions of the autonomous driving device 100 is referred to as a "a minimum drivable width", and a width (e.g., 0.8 m) including a margin of the sensor 110 in one direction of the autonomous driving device 100 is referred to as a "minimum width capable of slowing down".

For example, the interaction may indicate a function (or a scheme) where the autonomous driving device 100 interacts with a user. The TTS may indicate that the autonomous driving device 100 supports a function of outputting voice information through a speaker. The display may indicate that the autonomous driving device 100 supports a function of visually outputting information. The conversation may indicate that the autonomous driving device 100 supports a function of providing a voice response in response to a voice input of the user.

Only information about an autonomous mobile robot of H company is described in Table above, but the storage 120 may include pieces of information about autonomous driving devices 100 of a plurality of manufacturers.

The storage 120 may store a cross-driving rule (or an avoidance policy) of the autonomous mobile robot in a cross-driving situation. For example, in a situation where the plurality of autonomous mobile robots run into each other on the passage, the cross-driving rule may define a rule of an operation performed for cross-driving by each of the autonomous mobile robots according to the situation. For example, the cross-driving rule may include a criterion for determining an autonomous driving device 100 to drive along the passage and an autonomous driving device 100 to move to an edge of the passage (i.e., an autonomous driving device 100 to move out to the edge of the passage), based on the width of the passage, the size of each of the autonomous driving device 100 and the external autonomous driving device 100, the configuration of the sensor 110, and the margin of the sensor 110. For example, the avoidance policy may be referred below to as the cross-driving rule and may indicate a rule for allowing the autonomous mobile robot to avoid an obstacle to drive. For example, the avoidance policy may be a criterion for determining a driving scheme of the autonomous driving device 100 based on a width of a space through which the autonomous driving device 100 avoids the obstacle to pass, a size of the autonomous driving device 100, and a margin of the sensor 110. For example, the autonomous driving device 100 may determine whether to drive on a passage where the obstacle is present at a normal speed, drive on the passage at a decelerated speed, or stop driving on the passage, depending on the avoidance policy.

The storage 120 may store the information obtained by means of the sensor 110. For example, the storage 120 may store the image captured by means of the camera. The storage 120 may store the information obtained using the LiDAR sensor 110. The storage 120 may store data associated with performing an operation, a function, and/or a service of the autonomous driving device 100.

The storage 120 may store instructions executed by the processor 130. The storage 120 may include at least one of storage media such as a flash memory, a hard disk, a solid state disk (SSD), a secure digital (SD) card, an embedded multimedia card (eMMC), universal flash storage (UFS), removable disk, and/or web storage or storage media such as a random access memory (RAM), a static RAM (SRAM), a read only memory (ROM), a programmable ROM (PROM), an electrically erasable and programmable ROM (EEPROM), and/or an erasable and programmable ROM (EPROM).

The processor 130 may recognize an obstacle which is present on a passage on a first driving path set to a destination using the at least one sensor 110. For example, the processor 130 may obtain an image by capturing the front (e.g., a driving route direction) of the autonomous driving device 100 using the camera and may analyze the image to detect the obstacle. For example, the processor 130 may obtain data by sensing the periphery of the autonomous driving device 100 using the LiDAR sensor 110 and may recognize objects around the autonomous driving device 100 based on the obtained data.

The processor 130 may determine whether there is a need for cross driving with the obstacle to pass through the passage included in the driving path. For example, the processor 130 may determine whether the autonomous driving device 100 avoids the obstacle and passes through the passage based on a width of the passage, a size and a position of the obstacle, and a size of the autonomous driving device 100 (e.g., a width of the autonomous driving device 100). For example, when the obstacle is a non-movable object or a fixed object, the processor 130 may determine whether the autonomous driving device 100 is able to pass through the passage based on a current position and a size of the obstacle. For example, when the obstacle is moving or is a movable object (e.g., a wheelchair, a stroller, or a cart) or an external autonomous driving device 100, the processor 130 may determine whether the autonomous driving device 100 is able to pass through the passage when performing cross driving with the obstacle. When the movable object or the external autonomous driving device 100 moves to an edge of the passage, the processor 130 may determine whether it is possible for the autonomous driving device 100 to pass through the passage. For example, although the autonomous driving device 100 is unable to avoid the obstacle and pass through the passage at the position of the obstacle when the obstacle is detected, it may be possible for the autonomous driving device 100 to pass through the passage when the obstacle moves in the passage. For example, even when the obstacle moves to another position in the passage, the processor 130 may determine whether it is impossible for the autonomous driving device 100 to avoid the obstacle and pass through the passage. For example, when the width of an empty space of the passage where there is no obstacle is less than or equal to the width of the autonomous driving device 100 although the obstacle moves to the edge of the passage, the processor 130 may determine that it is impossible for the autonomous driving device 100 to pass through the passage. For example, when it is impossible for the autonomous driving device 100 to perform cross driving (i.e., whether the autonomous driving device 100 is unable to pass through the passage even when performing cross driving with the obstacle), the processor 130 may allow the autonomous driving device 100 to stop entering the passage (i.e., stop driving) or navigate another driving path to allow the autonomous driving device 100 to drive to a destination along the new driving path.

The processor 130 may determine a time to collision with the obstacle, based on the determination that there is the need for the cross driving. For example, the processor 130 may determine a time to collision with the obstacle, based on a driving speed of the autonomous driving device 100. When the obstacle is moving, the processor 130 may determine a time to collision with the obstacle based on a movement speed and a movement trajectory of the obstacle. For example, the processor 130 may track the movement speed and the movement trajectory of the obstacle using the at least one sensor 110.

The processor 130 may determine whether the obstacle is the external autonomous driving device 100 corresponding to the information included in the DB 121, based on the determination that the time to collision is less than a specified time (e.g., a threshold time). The processor 130 may perform the following operations on the basis of a distance from the obstacle rather than the time to collision with the obstacle. For example, the processor 130 may determine whether the obstacle is the external autonomous driving device 100 corresponding to the information included in the DB 121, based on the determination that the distance from the obstacle is less than a specified distance. For example, the processor 130 may determine whether the obstacle is the external autonomous driving device 100 registered in the DB 121. For example, the processor 130 may analyze an image obtained by capturing the obstacle and determine whether the obstacle is the external autonomous driving device 100 registered in the DB 121. The processor 130 may recognize an identification code (e.g., a QR code) of the obstacle using the at least one sensor 110 and may determine whether the obstacle is the external autonomous driving device 100 registered in the DB 121 based on the recognized identification code.

If the obstacle is the external autonomous driving device 100 corresponding to the information included in the DB 121, the processor 130 may recognize a cross-driving rule corresponding to the external autonomous driving device 100, which is stored in the storage 120. If the obstacle is not the external autonomous driving device 100 corresponding to the information included in the DB 121 (e.g., when the obstacle is not the external autonomous driving device 100 registered in the DB 121), the autonomous driving device 100 may recognize whether there is a person around the obstacle using the at least one sensor 110. For example, when the obstacle is an object incapable of being moved by itself, the processor 130 may determine whether the obstacle is movable depending on whether there is a person around the obstacle. If there is the person around the obstacle, the processor 130 may output an alarm (e.g., an alert) for providing a notification that the obstacle is present. For example, the processor 130 may output an alarm (e.g., an alert) for providing a notification that the obstacle is present and requesting to move the obstacle. The processor 130 may determine a third driving path following one edge of a passage after (or at the same time as) outputting the alarm and may allow the autonomous driving device 100 to drive on the passage along the third driving path. For example, the autonomous driving device 100 may provide the alarm to request the person around the obstacle to clear the obstacle. For example, when the person around the obstacle clears the obstacle from the passage or moves the obstacle in one direction depending on the alarm, the processor 130 may allow the autonomous driving device 100 to avoid the obstacle and pass through the passage. If there is the person around the obstacle, the processor 130 may determine a fourth driving path which does not include the passage and may allow the autonomous driving device 100 to drive along the fourth driving path or stop driving.

The processor 130 may determine a second driving path for passing through the passage based on the cross-driving rule. For example, the processor 130 may determine a device to drive on the passage and a device to move out to an edge of the passage between the autonomous driving device 100 and the external autonomous driving device 100 based on the cross-driving rule. The processor 130 may determine the second driving path to avoid the external autonomous driving device 100 to drive based on the cross-driving rule. For example, when the external autonomous driving device 100 moves to one edge of the passage, the processor 130 may determine the second driving path for driving near an opposite edge where the external autonomous driving device 100 moves to avoid the second external autonomous driving device 100 and pass through the passage.

The processor 130 may update the cross-driving rule (or the avoidance policy) based on a driving result including success or failure in driving, a time taken to reach the destination, and a time taken to pass through the passage.

If it is determined that the passage does not have sufficient space (or width) where the autonomous driving device 100 and the external autonomous driving device 100 will perform cross driving with each other based on the cross-driving rule, the processor 130 may output a notification that it is impossible to drive or may provide an external device (e.g., a control server) with the notification.

The processor 130 may calculate a width an unobstructed space in the passage at a point where it is expected to perform cross driving with the obstacle (i.e., a point where it will meet with the obstacle) with regard to the size and position of the obstacle and may adjust a driving speed of the autonomous driving device 100 or may stop driving the autonomous driving device 100, based on the calculated width of the space. For example, when the calculated width of the space is greater than a first reference value, the processor 130 may maintain the driving speed of the autonomous driving device 100 as a predetermined first speed (or a speed at which the autonomous driving device 100 is previously driving). When the calculated width of the space is less than or equal to the first reference value and is greater than a second reference value, the processor 130 may decrease the driving speed of the autonomous driving device 100 to a second speed lower than the first speed. When the width of the space is less than or equal to the second reference value, the processor 130 may navigate another driving path where the autonomous driving device 100 does not pass through the passage. The processor 130 may determine the first reference value and the second reference value less than the first reference value based on information about the size of the autonomous driving device 100 and the margin of the at least one sensor 110. For example, the autonomous driving device 100 may include sensors 110 (e.g., LiDAR sensors 110) arranged in left and right bidirectional directions. For example, the autonomous driving device 100 may determine a width ("a minimum drivable width") which includes both the margins of the sensors 110 at both sides of the autonomous driving device 100 in the width of the autonomous driving device 100 as the first reference value and may determine a width ("a minimum width capable of slowing down") which includes the margin of the sensor 110 in one direction in the width of the autonomous driving device 100 as the second reference value.

For example, the processor 130 may determine that the driving space is sufficient and may allow the autonomous driving device 100 to drive at a normal speed on the passage, when the width of the passage is greater than the minimum drivable width, may determine that the driving space is insufficient and may allow the autonomous driving device 100 to decrease to a speed lower than the normal speed and drive at the speed lower than the normal speed on the passage, when the width of the passage is less than or equal to the minimum drivable width and is greater than the minimum width capable of slowing down, and may determine that the autonomous driving device 100 is unable to pass through the passage and may stop driving the autonomous driving device 100 or may navigate another driving path, when the width of the passage is less than or equal to the minimum width capable of slowing down.

For example, Table 2 below indicates determination criteria when an obstacle is detected.

TABLE 2

| Determination result | Determination criteria when obstacle is detected |
|---|---|
| Space sufficiency | Space width calculated at expected cross driving point > minimum drivable width |
| Space insufficiency | Space width calculated at expected cross driving point ≤ minimum drivable width<br>Space width calculated at expected cross driving point > minimum width capable of slowing down |
| Cross driving impossibility | Space width calculated at expected cross driving point ≤ minimum width capable of slowing down |

The processor 130 may control an operation of the autonomous driving device 100 depending on the determination result when the obstacle is detected and whether a person is detected around the obstacle. For example, the processor 130 may control the autonomous driving device 100 to drive depending on the cross-driving rule corresponding to the external autonomous driving device 100, which is stored in the storage 120, when the obstacle is the identifiable external autonomous driving device 100 registered in the DB 121, and may control the autonomous driving device 100 to drive depending on the determination criterion when the obstacle is detected, which is shown in Table 2 above, and whether a person is detected around the obstacle, when the obstacle is not the identifiable external autonomous driving device 100.

For example, Table 3 below is an example of an operation of the autonomous driving device 100 depending on the determination result when the obstacle is detected and whether the person is detected around the obstacle.

TABLE 3

| Determination result | When person is detected | When person is not detected |
|---|---|---|
| Space sufficiency | Avoidance driving Output alarm (output TTS) | Avoidance driving |
| Space insufficiency | Avoidance driving Output alarm (output TTS) | Slowing-down avoidance driving Output alarm (output TTS) |
| Cross driving impossibility | Management notification Request remote control from manager | Navigate another path |

For example, the processor 130 may perform avoidance driving for avoiding the obstacle at a reference speed (or a predetermined speed), when the space is sufficient, and may avoidance driving for avoiding the perform slowing-down obstacle at a speed slower than the reference speed, when the space is insufficient. When it is impossible for the autonomous driving device 100 to perform cross driving, the processor 130 may stop driving the autonomous driving device 100 or may navigate another path. For example, when the person is detected around the obstacle, the processor 130 may output an alarm (e.g., an alert) for providing a notification that the obstacle is present. For example, the alarm may include contents for requesting to move the obstacle. If it is impossible for the autonomous driving device 100 to perform cross driving, the processor 130 may transmit a notification that the obstacle is present to an external device (e.g., an external manager device or a control server) or may request remote control of the autonomous driving device 100 from the external device. The operation controlled by the autonomous driving device 100 (e.g., the processor 130) is not limited to those shown in Table 3 above, and an operation performed in each case may be changed. For example, the processor 130 may navigate another path without performing slowing-down avoidance driving, when the space is sufficient and the person is not detected, and may end the driving of the autonomous driving device 100 or may navigate another path, when it is impossible for the autonomous driving device 100 to perform cross driving and the person is detected. The processor 130 may change the operation performed by the autonomous driving device 100 according to whether the person is detected around the obstacle, based on a driving result including success or failure in driving, a time taken to reach the destination, and/or a time taken to pass through the passage.

The components of the autonomous driving device 100 are not limited to those shown in FIG. 1, which may further include an additional component. For example, the autonomous driving device 100 may further include a mobility device (not shown) (e.g., a wheel or a leg) and/or a driving device (not shown) for controlling the mobility device. For example, the autonomous driving device 100 may further include a display (or a touch screen) for visually displaying information and/or a speaker for audibly outputting information. The autonomous mobile robot may further include a communication circuit (not shown). The autonomous mobile robot may transmit and receive data with an external device (e.g., an external control server, an external autonomous mobile robot, and/or a manager device) through the communication circuit. For example, the autonomous mobile robot may receive information associated with another autonomous mobile robot and an avoidance policy in a specific situation (e.g., a cross-driving situation).

Figure 2:
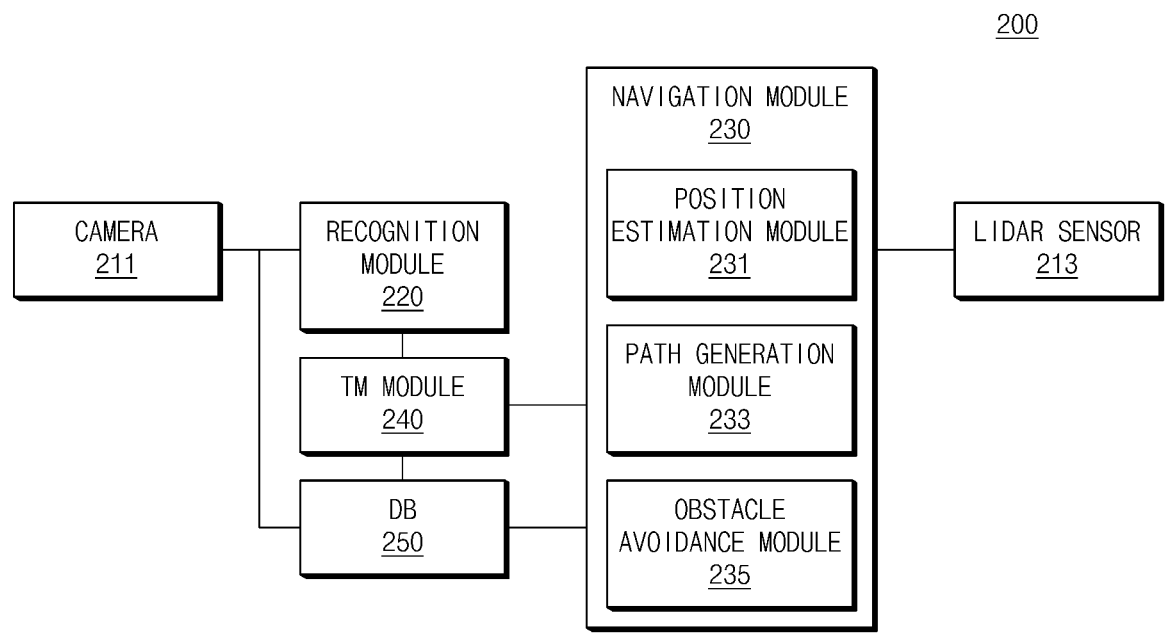
FIG. 2 is a block diagram of an autonomous driving device.

FIG. 2 is a block diagram of an autonomous driving device.

An autonomous driving device 200 may include a camera 211, a LIDAR sensor 213, a recognition module 220, a task manager (TM) module 240, a navigation module 230, and a DB 250.

The camera 211 may capture the outside of the autonomous driving device 200 to obtain image information (e.g., an image). For example, the camera 211 may generate image information by capturing an obstacle in front of the autonomous driving device 200. The camera 211 may provide the recognition module 220 with the obtained image information.

The LiDAR sensor 213 may sense an external object outside the autonomous driving device 200. For example, the LIDAR sensor 213 may obtain information about a position of the external object, a distance from the external object, and/or a shape of the external object. The LiDAR sensor 213 may provide the navigation module 230 with the obtained information about the external object.

The recognition module 220 may recognize an external object (e.g., an obstacle) based on the image obtained by means of the camera 211. The recognition module 220 may recognize a type of the obstacle based on the image. For example, the recognition module 220 may recognize whether the obstacle is an external autonomous driving device 200, a movable object (e.g., a stroller, a cart, or a wheelchair), or a fixed object. The recognition module 220 may recognize whether there is a person around the obstacle based on the image. When the obstacle is the external autonomous driving device 200, the recognition module 220 may recognize whether the external autonomous driving device 200 is the autonomous driving device 200, information of which is registered in the DB 250. The recognition module 220 may provide the TM module 240 and/or the navigation module 230 with the recognized information.

The TM module 240 may control a full service sequence of an autonomous mobile robot. For example, the TM module 240 may control the autonomous driving device 200 to sequentially perform at least one scenario (or operation) for providing a specified service. For example, the TM module 240 may be a main processor of the autonomous driving device 200, which may control the overall operation of the autonomous driving device 200. For example, the TM module 240 may control operations of the camera 211, the LiDAR sensor 213, the recognition module 220, and the navigation module 230 and may manage the DB 250.

The navigation module 230 may include a position estimation module 231, a path generation module 233, and an obstacle avoidance module 235.

The position estimation module 231 may estimate a position of the autonomous driving device 200. For example, the position estimation module 231 may analyze sensor data obtained by means of the camera 211 and the LiDAR sensor 213 and may estimate a current position of the autonomous driving device 200. For example, the position estimation module 231 may determine whether the autonomous driving device 200 is placed at any position in a specific space where the autonomous driving device 200 provides a service. The position estimation module 231 may recognize a position of the autonomous driving device 200 based on transmission and reception of a data signal including a global positioning system (GPS) signal.

The path generation module 233 may generate or correct a movement path to a destination to provide a service. For example, when it is impossible for the autonomous driving device 200 to drive due to an obstacle on a previously generated driving path, the path generation module 233 may generate a new driving path (or correct the previously generated driving path to the new driving path). The path generation module 233 may generate a path for avoiding the obstacle based on obstacle-related information received from the obstacle avoidance module 235.

The obstacle avoidance module 235 may detect an obstacle based on the sensor data obtained using the LiDAR sensor 213 and may determine an avoidance policy (or a cross-driving rule) for avoiding the obstacle. For example, when the detected obstacle is the external autonomous driving device 200, information of which is registered in the DB 250, the obstacle avoidance module 235 may search the DB 250 for a cross-driving rule (or an avoidance policy) corresponding to the external autonomous driving device 200. In a situation where the plurality of autonomous mobile robots run into one another on the passage, the cross-driving rule may indicate a rule of an operation performed for cross driving by each of the autonomous mobile robots according to the situation. For example, the cross-driving rule may criterion (e.g., driving priorities between the autonomous driving devices 200) for determining an autonomous driving device 200 to drive along the passage and an autonomous driving device 200 to move to an edge of the passage (i.e., an autonomous driving device 200 to move out to the edge of the passage), based on the width of the passage, the size of each of the autonomous driving device 200 and the external autonomous driving device 200, the sensor configuration, and the margin of the sensor. The obstacle avoidance module 235 may recognize an operation for avoiding the external autonomous driving device 200 based on the found the cross-driving rule. For example, the obstacle avoidance module 235 may determine a driving path for avoiding the obstacle, a driving speed for avoiding the obstacle, and/or whether to output a notification that the obstacle is present. The obstacle avoidance module 235 may recognize a width of the passage, a position of the obstacle, or motion (e.g., a movement direction and a movement speed) of the obstacle, based on the sensor data obtained through the LiDAR sensor 213. The obstacle avoidance module 235 may determine whether the autonomous driving device 200 is able to pass through the passage, based on the width of the passage, the width of the autonomous driving device 200, a sensor margin of the autonomous driving device 200, the position of the obstacle, and/or the motion of the obstacle. For example, the obstacle avoidance module 235 may calculate a width of an unobstructed space in the passage at a point where the autonomous driving device 200 is expected to perform cross driving with the obstacle (i.e., a point where the autonomous driving device 200 is expected to meet with the obstacle) with regard to the size and position of the obstacle and may control the autonomous driving device 200 to adjust a driving speed or stop driving, based on the calculated width of the space. For example, when the calculated width of the space is greater than a first reference value, the obstacle avoidance module 235 may maintain the driving speed of the autonomous driving device 200 as a predetermined first speed (or a speed at which the autonomous driving device 200 is previously driving). When the calculated width of the space is less than or equal to the first reference value and is greater than a second reference value, the obstacle avoidance module 235 may decrease the driving speed of the autonomous driving device 200 to a second speed lower than the first speed. When the width of the space is less than or equal to the second reference value, the obstacle avoidance module 235 may navigate another driving path where the autonomous driving device 200 does not pass through the passage. The obstacle avoidance module 235 may determine the first reference value and the second reference value less than the first reference value based on information about the size of the autonomous driving device 200 and the margin of the at least one sensor. When the autonomous driving device 200 is unable to pass through the passage, the obstacle avoidance module 235 may allow the autonomous driving device 200 to stop driving or may allow the path generation module 233 to navigate a new driving path.

The DB 250 may store information associated with the plurality of autonomous driving devices 200. For example, the information associated with each of the plurality of autonomous driving devices 200 may include per-type identification information of each of the plurality of autonomous driving devices 200, manufacturer information of each of the plurality of autonomous driving devices 200, size (e.g., length, width, and/or height) information of each of the plurality of autonomous driving devices 200, sensor configuration information, and/or margin information of the sensor. The DB 250 may include a cross-driving rule (or an avoidance policy) between the autonomous driving devices 200.

The camera 211 and the LiDAR sensor 213 may be included in at least one sensor 110 of FIG. 1. The recognition module 220, the TM module 240, and the navigation module 230 are illustrated and described as separate components, but at least some of the recognition module 220, the TM module 240, and the navigation module 230 may be implemented as one component. For example, the recognition module 220, the TM module 240, and the navigation module 230 may be included in a processor 130 of FIG. 1. The DB 250 may be included in storage 120 of FIG. 1. The components of the autonomous driving device 200 are not limited to those shown in FIG. 2. Some of the components of the autonomous driving device 200 may be omitted or at least one component (e.g., at least one of components of FIG. 7) may be added to the components of the autonomous driving device 200.

Figure 3:
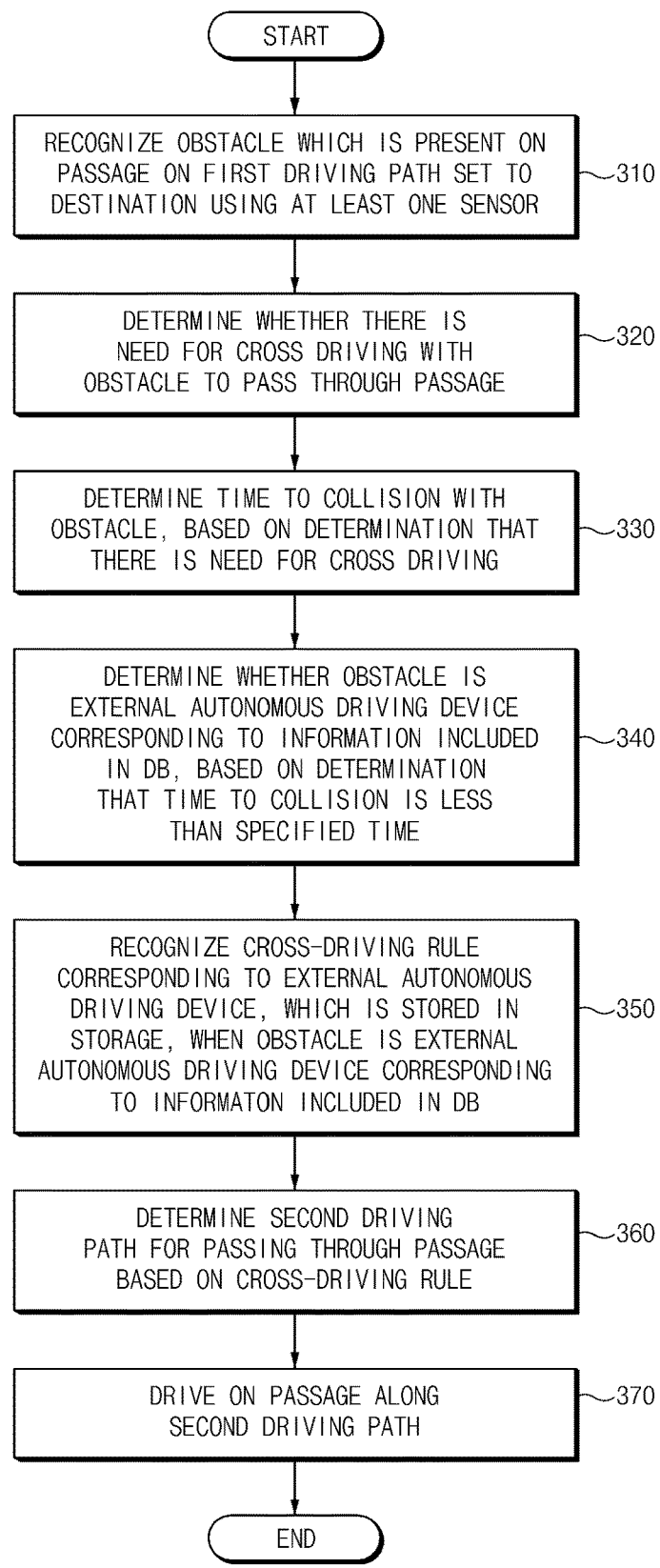
FIG. 3 is a flowchart of a driving control method.

Hereinafter, a description will be given in detail of a driving control method with reference to FIGS. 3 and 6. FIGS. 3 to 6 are flowcharts for describing a vehicle control method.

Hereinafter, it is assumed that an autonomous driving device 100 of FIG. 1 (or an autonomous driving device 200 of FIG. 2) performs a process of FIGS. 3 to 6. Furthermore, in a description of FIGS. 3 to 6, an operation described as being performed by an autonomous driving device may be understood as being controlled by a processor 130 of an autonomous driving device 100 (or a recognition module 220, a TM module 240, and a navigation module 230 of FIG. 2).

FIG. 3 is a flowchart of a driving control method.

In operation 310, the autonomous driving device may recognize an obstacle which is present on a passage on a first driving path set to a destination using the at least one sensor. For example, the at least one sensor may include at least one camera and at least one LiDAR sensor. For example, the autonomous driving device may obtain an image by capturing the front (e.g., a driving path direction) of the autonomous driving device using the camera and may analyze the image to detect an obstacle (e.g., an object, a person, etc. that may be moving or stationary). For example, the autonomous driving device may obtain data by sensing the periphery of the autonomous driving device using the LiDAR sensor and may recognize objects around the autonomous driving device based on the obtained data.

In operation 320, the autonomous driving device may determine whether there is a need for cross driving with the obstacle to pass through the passage. For example, the autonomous driving device may determine whether the autonomous driving device avoids the obstacle and passes through the passage based on a width of the passage, a size and a position of the obstacle, and a size of the autonomous driving device (e.g., a width of the autonomous driving device). For example, when the obstacle is a non-movable object or a fixed object, the autonomous driving device may determine whether it is able to pass through the passage based on a current position and a size of the obstacle. For example, when the obstacle is moving or is a movable object (e.g., a wheelchair, a stroller, or a cart) or an external autonomous driving device (e.g., a second autonomous driving device), the autonomous driving device may determine whether it is able to pass through the passage when performing cross driving with the obstacle. As used herein, "cross driving" may mean driving across each other's path. For example, two moving objects (e.g., a first autonomous driving device and a second external autonomous driving device) may cross paths with other or cross each other's path (e.g., the first moving object may cross the second moving object's moving path and vice versa) without colliding with each other. When the movable object or the external autonomous driving device moves to an edge of the passage, the autonomous driving device may determine whether it is possible for the autonomous driving device to pass through the passage. For example, even though the autonomous driving device is unable to avoid the obstacle and pass through the passage at the position of the obstacle when the obstacle is detected, it may be possible for the autonomous driving device to pass through the passage when the obstacle moves along the passage. For example, even when the another position in the passage, the obstacle moves to autonomous driving device may determine whether it is impossible for the autonomous driving device to avoid the obstacle and pass through the passage. For example, when the width of an empty space of the passage where there is no obstacle is less than or equal to the width of the autonomous driving device although the obstacle moves to the edge of the passage, the autonomous driving device may determine that it is impossible for the autonomous driving device to pass through the passage. For example, when it is impossible for the autonomous driving device to perform cross driving (i.e., whether the autonomous driving device is unable to pass through the passage even when performing cross driving with the obstacle), the autonomous driving device may stop entering the passage (i.e., stop driving) or may navigate another driving path where the autonomous driving device does not pass through the passage to drive to a destination along the new driving path.

In operation 330, the autonomous driving device may determine a time to collision with the obstacle, based on the determination that there is the need for the cross driving. For example, the autonomous driving device may determine a time to collision with the obstacle, based on a driving speed of the autonomous driving device. When the obstacle is moving, the autonomous driving device may determine a time to collision with the obstacle based on a movement speed and a movement trajectory of the obstacle. For example, the autonomous driving device may track the movement speed and the movement trajectory of the obstacle using the at least one sensor. A description will be given below of the case where the autonomous driving device determines a time to collision, but the autonomous driving device may perform the following operations on the basis of a distance from the obstacle rather than the time to collision with the obstacle.

In operation 340, the autonomous driving device may determine whether the obstacle is an external autonomous driving device corresponding to the information included in the DB, based on the determination that the time to collision is less than a specified time (e.g., a threshold time). For example, the autonomous driving device may include the DB including information associated about each of the plurality of autonomous driving devices. For example, the information associated with each of the plurality of autonomous driving devices may include identification information (e.g., a model name) of each of the plurality of autonomous driving devices, manufacturer information of each of the plurality of autonomous driving devices, size information of each of the plurality of autonomous driving devices (e.g., a height and a width of an autonomous mobile robot), a configuration of a sensor included in the autonomous mobile robot, a margin setting value of the sensor, and/or information about a supported interaction type. For example, information about at least one external autonomous driving device may be registered in the DB. The autonomous driving device may receive information about the external autonomous driving device from an external device (e.g., a control server and/or an external autonomous driving device) and may update the DB based on the received information. For example, the autonomous driving device may determine whether the obstacle is an autonomous driving device registered in the DB. For example, the autonomous driving device (e.g., a first autonomous driving device) may analyze an image obtained by capturing the obstacle and may determine whether the obstacle is the external autonomous driving device (e.g., a second autonomous driving device) registered in the DB. The autonomous driving device may recognize an identification code (e.g., a QR code) of the obstacle using the at least one sensor and may determine whether the obstacle is the external autonomous driving device registered in the DB based on the identified identification code.

In operation 350, when the obstacle is the external autonomous driving device corresponding to the information included in the DB, the autonomous driving device may recognize a cross-driving rule corresponding to the external autonomous driving device, which is stored in its storage. For example, the storage of the autonomous driving device may include a cross-driving rule (or an avoidance policy) corresponding to the external autonomous driving device corresponding to the information included in the DB (or the external autonomous driving device registered in the DB) other than the DB. For example, in a situation where the plurality of autonomous mobile robots run into one another on the passage, the cross-driving rule indicates a rule of an operation performed for cross-driving by each of the autonomous mobile robots according to the situation. For example, the cross-driving rule may include one or more criteria for determining an autonomous driving device to drive along the passage and an autonomous driving device to move to an edge of the passage (i.e., an autonomous driving device to move out to the edge of the path), based on the width of the passage, the size of each of the autonomous driving device and the external autonomous driving device, the sensor configuration, and the margin of the sensor. For example, the avoidance policy may be referred below to as the cross-driving rule and may indicate a rule for allowing the autonomous mobile robot to avoid an obstacle to drive. For example, the avoidance policy may be a criterion for determining a driving scheme of the autonomous driving device based on a width of a space through which the autonomous driving device avoids and passes and a size of the autonomous driving device, and a sensor margin of the autonomous driving device.

If the obstacle is not the external autonomous driving device corresponding to the information included in the DB (i.e., the external autonomous driving device registered in the DB), the autonomous driving device may recognize whether there is a person around the obstacle using the at least one sensor. For example, when the obstacle is an object incapable of being moved by itself, whether the obstacle is movable may be determined depending on whether there is a person around the obstacle. If there is the person around the obstacle, the autonomous driving device may output an alarm (e.g., an alert) for providing a notification that the obstacle is present. For example, the autonomous driving device may output an alarm for providing a notification that the obstacle is present and requesting to move the obstacle. The autonomous driving device may determine a third driving path following one edge of the passage after (or at the same time as) outputting the alarm and may drive on the passage along the third driving path. For example, the autonomous driving device may provide the alarm to request the person around the obstacle to clear the obstacle. For example, when the person around the obstacle clears the obstacle from the passage or moves the obstacle in one direction depending on the alarm, the autonomous driving device may avoid the obstacle and may pass through the passage. If there is the person around the obstacle, the autonomous driving device may determine a fourth driving path which does not include the passage and may drive along the fourth driving path or stop driving.

In operation 360, the autonomous driving device may determine a second driving path for passing through the passage based on the cross-driving rule. For example, the autonomous driving device may determine a device to drive on the passage and a device to move out to an edge of the passage between the autonomous driving device and the external autonomous driving based on the cross-driving rule. The autonomous driving device may determine the second driving path to avoid the external autonomous driving device to drive based on the cross-driving rule. For example, when the external autonomous driving device moves to one edge of the passage, the autonomous driving device may determine the second driving path for driving near an opposite edge where the external autonomous driving device moves to avoid the external autonomous driving device and pass through the passage.

If it is determined that the passage does not have sufficient space (or width) where the autonomous driving device and the external autonomous driving device will perform cross driving with each other based on the cross-driving rule, the autonomous driving device may output a notification that it is impossible to drive or may provide an external device (e.g., a control server) with the notification.

The autonomous driving device may calculate a width of an unobstructed space in the passage at a point where it is expected to perform cross driving with the obstacle (i.e., a point where it will meet with the obstacle) with regard to the size and position of the obstacle and may adjust its driving speed or may stop driving, based on the calculated width of the space. For example, when the calculated width of the space is greater than a first reference value, the autonomous driving device may maintain the driving speed of the autonomous driving device as a predetermined first speed (or a speed at which the autonomous driving device is previously driving). When the calculated width of the space is less than or equal to the first reference value and is greater than a second reference value, the autonomous driving device may decrease the driving speed to a second speed lower than the first speed. When the width of the space is less than or equal to the second reference value, the autonomous driving device may navigate another driving path where the autonomous driving device does not pass through the passage. The autonomous driving device may determine the first reference value and the second reference value less than the first reference value based on information about the size of the autonomous driving device and the margin of the at least one sensor.

In operation 370, the autonomous driving device may drive on the passage along the second driving path. The autonomous driving device may pass through the passage to move to the destination. The autonomous driving device may repeatedly perform operations 310 to 370 while moving to the destination.

Figure 4:
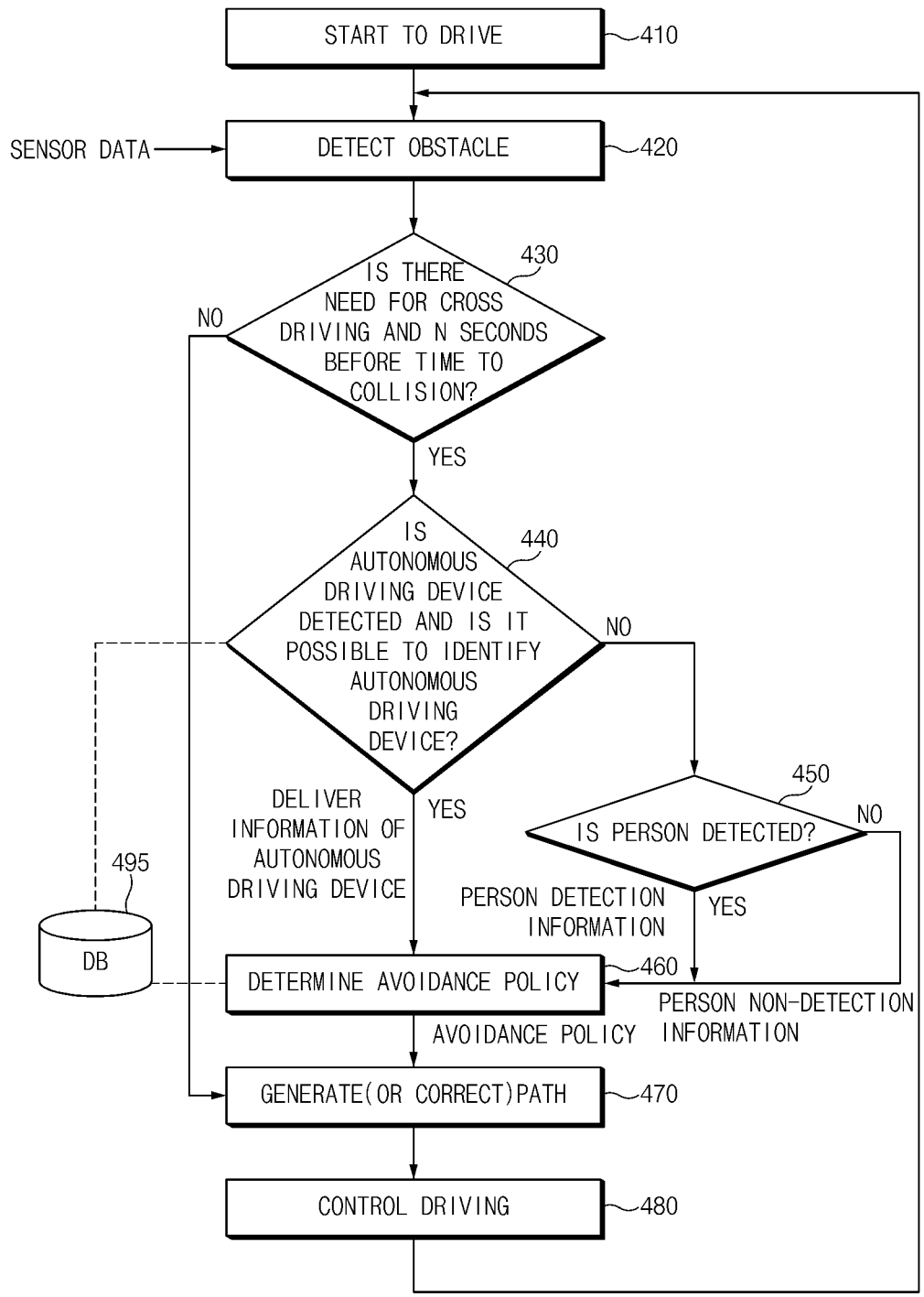
FIG. 4 is a flowchart of a driving control method.

FIG. 4 is a flowchart of a driving control method.

In operation 410, an autonomous driving device may start to drive to a destination. For example, the autonomous driving device may generate (or navigate) a driving path to the destination and may drive along the generated driving path.

In operation 420, the autonomous driving device may detect an obstacle using at least one sensor. As an example, the autonomous driving device may detect an obstacle using RGB data obtained using an image sensor (e.g., a camera) and LiDAR data obtained using a LiDAR sensor. For example, the autonomous driving device may detect an obstacle which is present on a passage on the driving path.

In operation 430, the autonomous driving device may determine whether there is a need for cross driving and whether less than the specified time (e.g., N seconds) remains from the time to collision with the obstacle, based on the information detected using the sensor. For example, the autonomous driving device may determine whether there is a need to avoid the obstacle presenting on the passage to drive, based on a width of the passage on the driving path, a size of the autonomous driving device, and a size and position of the obstacle presenting on the passage. For example, when there is a need to drive on the passage along a corrected driving path rather than an existing driving path to pass through the passage where the obstacle is present or when there is a need to move the obstacle to pass through the passage, the autonomous driving device may determine that there is the need for the cross driving. For example, when it is able to pass through the passage without the movement of the obstacle or the correction of the driving path of the autonomous driving device or when it is unable to pass through the passage although the obstacle is moved or the driving path of the autonomous driving device is corrected, the autonomous driving device may determine that there is no need for the cross driving.

The autonomous driving device may perform operation 440, when there is the need for the cross driving and when less than the specified time (e.g., N seconds) remains from the time to collision with the obstacle, and may perform operation 470, when there is no need for the cross driving and when more than the specified time remains from the time to collision with the obstacle.

In operation 440, the autonomous driving device may determine whether an external autonomous driving device (e.g., an external autonomous mobile robot) is detected and whether it is possible to identify the detected external autonomous driving device. For example, the autonomous driving device may analyze an obstacle image obtained using the image sensor and may determine whether the obstacle is the external autonomous driving device. When the obstacle is the external autonomous driving device, the autonomous driving device may determine whether it is possible to identify the external autonomous driving device based on information stored in a DB 495. For example, the DB 495 of the autonomous driving device may include information about a plurality of autonomous driving devices. The autonomous driving device may register the information about the plurality of autonomous driving devices in the DB 495. The autonomous driving device may determine whether the detected external autonomous driving device is an autonomous driving device, information of which is registered in the DB 495. When the information of the external autonomous driving device is registered in the DB 495, the autonomous driving device may identify the external autonomous driving device. If the external autonomous driving device is detected and it is possible to identify the external autonomous driving device, the autonomous driving device may perform operation 460 based on the identified information. When the external autonomous driving device is not detected or when the external autonomous driving device is not identified, the autonomous driving device may perform operation 450.

In operation 450, the autonomous driving device may detect a person around the obstacle using the sensor. For example, the autonomous driving device may perform operation 460 based on person detection information (e.g., information indicating that the person is detected around the obstacle), when the person is detected around the obstacle, and may perform operation 460 based on person non-detection information (e.g., information indicating that the person is not detected around the obstacle), when the person is not detected around the obstacle.

In operation 460, the autonomous driving device may determine an avoidance policy. For example, the autonomous driving device may determine the avoidance policy based on information of the identified external autonomous driving device, the person detection information, and/or the person non-detection information. The DB 495 may include the avoidance policy associated with each of the plurality of autonomous driving devices. For example, the DB 495 may include a cross-driving rule corresponding to the external autonomous driving device. When the external autonomous driving device is identified, the autonomous driving device may recognize a cross-driving rule (or an avoidance policy) corresponding to the external autonomous driving device, which is stored in the DB 495. For example, the cross-driving rule may include a rule for determining a device to drive on the passage and a device to move to an edge of the passage to make a driving space between the autonomous driving device and the external autonomous driving device such that the autonomous driving device passes through the passage. A detailed operation associated with the cross-driving rule will be described in detail below with reference to FIG. 6.

If it is impossible to identify the external autonomous driving device, the autonomous driving device may determine an avoidance policy for avoiding the obstacle based on each of a situation where the person is detected around the obstacle and a situation where the person is not detected around the obstacle. For example, the avoidance policy may define an operation to be performed by the autonomous driving device depending on whether the person is detected, a width of the passage on the driving path, a size of the autonomous driving device, and a sensor margin of the autonomous driving device. An operation associated with whether the person is detected around the obstacle will be described in detail below with reference to FIG. 5.

In operation 470, the autonomous driving device may correct the driving path depending on the avoidance policy (or the cross-driving rule) determined in operation 460. The autonomous driving device may correct the driving path to move to an edge of the passage such that the external autonomous driving device passes through the passage depending on the cross-driving rule or may correct the driving path to avoid the external autonomous driving device and pass through the passage when the autonomous driving device moves to the edge of the passage. If it is possible to drive along an existing driving path even without movement of the obstacle (e.g., the external autonomous driving device), the autonomous driving device may maintain the driving path without correcting the driving path. If there is no method to pass through the passage where the obstacle is present, the autonomous driving device may generate a new driving path where the autonomous driving device is able to reach a destination without passing though the passage where the obstacle is present.

If it is impossible to identify the external autonomous driving device and when the person is detected around the obstacle, the autonomous driving device may generate and output an alarm (e.g., an alert) for requesting to move the obstacle. For example, when the obstacle presenting on the passage on the predetermined driving path is moved and when a space where the autonomous driving route is able to pass through the passage is made, it may be more efficient for the autonomous driving device to wait for a specified time until the obstacle is moved by means of the alarm and pass through the passage on the predetermined driving path rather than navigating another driving path. For example, under determination that it is difficult to move the obstacle when it is impossible to identify the external autonomous driving device and when the person is not detected around the obstacle, the autonomous driving device may navigate another driving path without outputting a separate notification when it is impossible to drive in a space on the driving path.

In operation 480, the autonomous driving device may control driving based on the generated or corrected driving path. For example, the autonomous driving device may drive to the destination along the driving path generated or corrected in real time.

Figure 5:
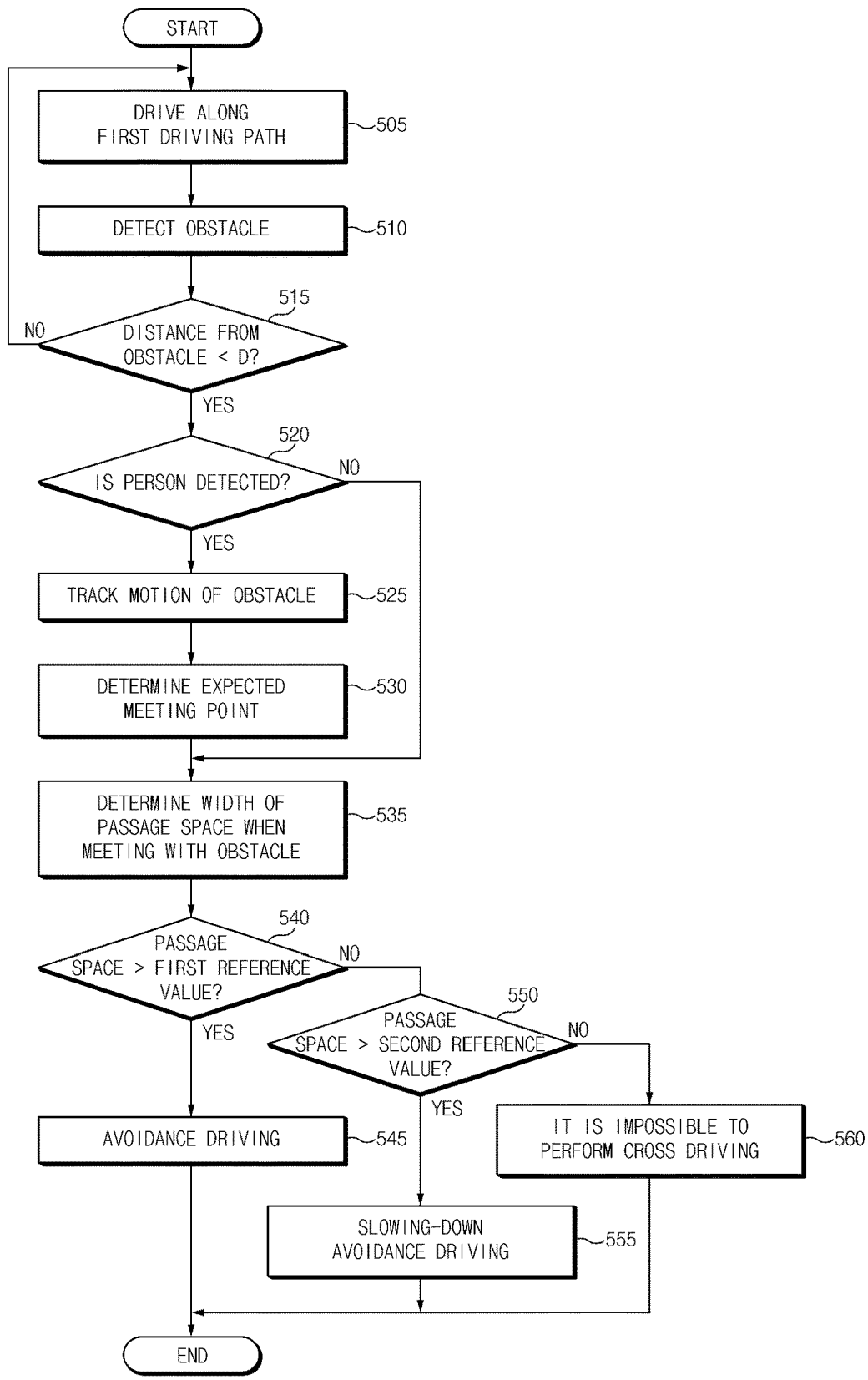
FIG. 5 is a flowchart of a driving control method.
Figure 6:
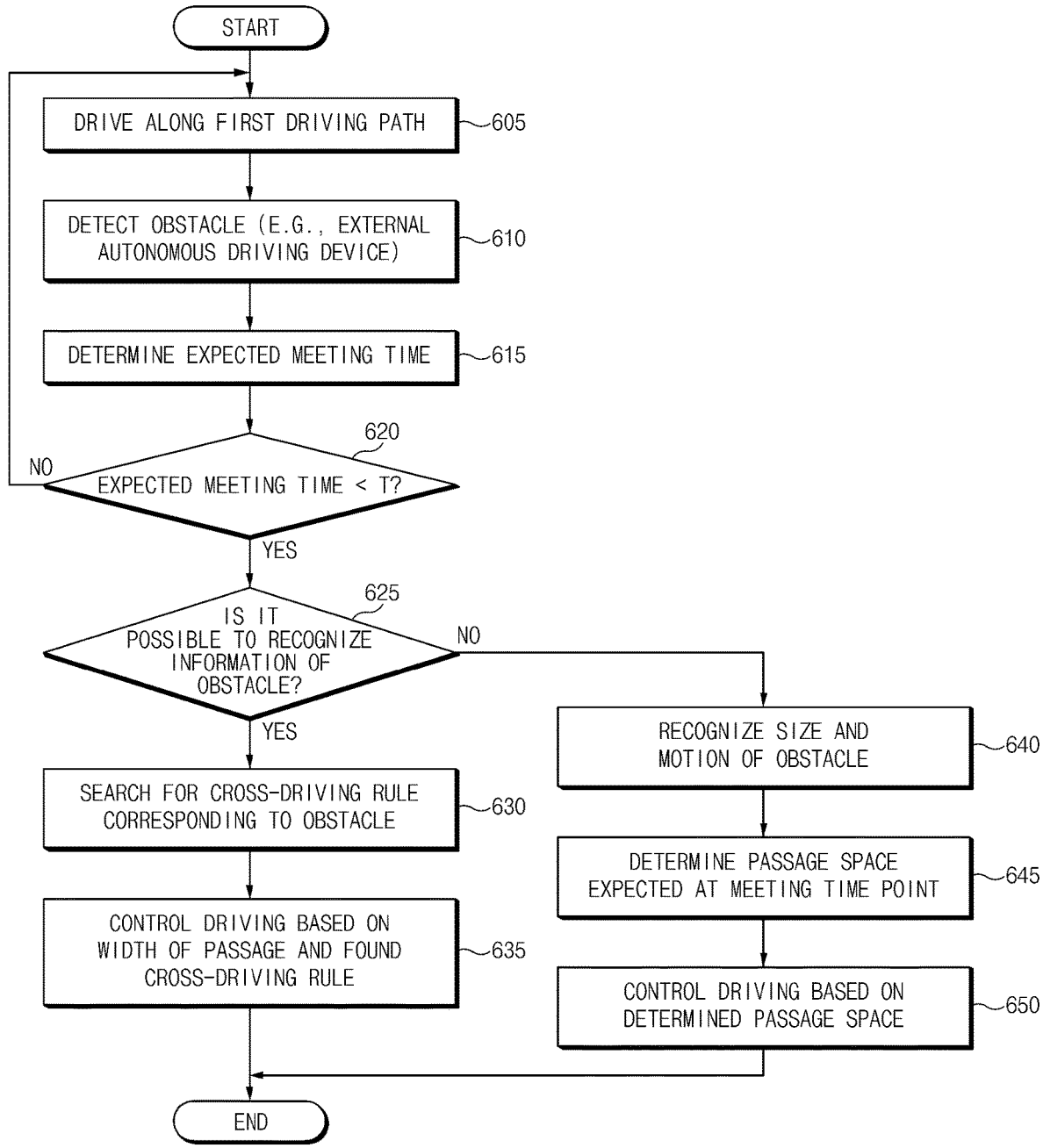
FIG. 6 is a flowchart of a driving control method.

FIG. 5 is a flowchart of a driving control method. For example, it is assumed that a detected obstacle is not an external autonomous driving device in FIG. 5.

In operation 505, an autonomous driving device may drive along the first driving path. For example, the autonomous driving device may navigate the first driving path for reaching a destination and may drive at a specified speed (e.g., a reference speed) along the navigated first driving path.

In operation 510, the autonomous driving device may detect an obstacle. As an example, the autonomous driving device may detect an obstacle (e.g., a stroller, a cart, or a wheelchair) using at least one sensor (e.g., an image sensor) and may recognize that the obstacle is not the external autonomous driving device.

In operation 515, the autonomous driving device may determine whether a distance from the obstacle is within a specified distance D. As an example, the autonomous driving device may recognize the distance from the obstacle using at least one sensor (e.g., a LiDAR sensor). The autonomous driving device may perform operation 520, when the distance from the obstacle is within the specified distance, and may continue driving along the first driving path in operation 505, when the distance from the obstacle is out of the specified distance.

In operation 520, the autonomous driving device may recognize whether there is a person around the obstacle. For example, the autonomous driving device may recognize whether there is a person based on an image obtained by capturing the periphery of the obstacle using the image sensor. The autonomous driving device may perform operation 525 when the person is detected around the obstacle and may perform operation 535 when the person is not detected around the obstacle.

In operation 525, the autonomous driving device may track motion of the obstacle. For example, when the obstacle moves, the autonomous driving device may detect a movement direction and a movement speed of the autonomous driving device using the at least one sensor. For example, when the obstacle does not move, the autonomous driving device may generate and output a notification that the obstacle is present and a notification for requesting to move the obstacle. For example, the person around the obstacle may move the obstacle not to interfere with the driving of the autonomous driving device, depending on the notification. For example, the autonomous driving device may stop driving during a specified time after outputting the notification and may track motion of the obstacle. For example, when there is the person around the obstacle and when the person clears the obstacle, it may be more efficient for the autonomous driving device to waits for the specified time and drive along an initially set driving path rather than navigating a new path and detouring to the destination.

In operation 530, the autonomous driving device may determine an expected meeting point with the obstacle, based on the tracked motion of the obstacle. For example, the autonomous driving device may predict a position where the autonomous driving device runs into the obstacle in the passage based on a movement direction and speed of the obstacle and a movement direction and speed of the autonomous driving device.

In operation 535, the autonomous driving device may determine a width of a passage space when meeting with the obstacle. For example, the autonomous driving device may calculate a width of a space which is not blocked by the obstacle in the passage at a point where the autonomous driving device meets with the obstacle.

The autonomous driving device may perform operation 545, when the passage space is greater than a first reference value in operation 540, and may perform operation 550, when the passage space is less than or equal to the first reference value in operation 540. For example, the autonomous driving device may set a value obtained by adding left and right sensor margin values of the autonomous driving device to the width of the autonomous driving device to the first reference value. For example, the first reference value may indicate a minimum drivable width.

In operation 545, the autonomous driving device may avoid the obstacle to drive on the passage. For example, the autonomous driving device may avoid the obstacle at a speed where the autonomous driving device is previously driving to pass through the passage. If the person is detected around the obstacle in operation 520, the autonomous driving device may output a notification that the obstacle is present and/or that the autonomous driving device is driving.

The autonomous driving device may perform operation 555, when the passage space is greater than a second reference value in operation 550, and may perform operation 560, when the passage space is less than or equal to the second reference value in operation 550. For example, the autonomous driving device may set a value obtained by adding a sensor margin value in one direction of the autonomous driving device to the width of the autonomous driving device to the second reference value. For example, the second reference value may indicate a minimum width capable of slowing down.

In operation 555, the autonomous driving device may avoid the obstacle at a speed slower than the speed where the autonomous driving device is previously driving to drive on the passage. If the person is detected around the obstacle in operation 520, the autonomous driving device may output a notification that the obstacle is present and/or that the autonomous driving device is driving.

In operation 560, the autonomous driving device may stop driving on the passage, under the determination that it is impossible to perform cross driving. The autonomous driving device may navigate another driving path where it is able to reach the destination except for the passage where the obstacle is present. If the person is detected around the obstacle in operation 520, the autonomous driving device may provide the person around the obstacle or an external device (e.g., a management device or a control server) with a notification that it is impossible to drive due to the obstacle.

FIG. 6 is a flowchart of a driving control method. For example, it is assumed that a detected obstacle is an external autonomous driving device in FIG. 6.

In operation 605, an autonomous driving device may drive along a first driving path. For example, the autonomous driving device may navigate the first driving path for reaching a destination and may drive at a specified speed (e.g., a reference speed) along the navigated first driving path.

In operation 610, the autonomous driving device may detect an obstacle. For example, the autonomous driving device may detect motion of the obstacle based on sensor data obtained using at least one sensor. The autonomous driving device may recognize that the obstacle is an autonomous driving device (e.g., an autonomous mobile robot) based on the sensor data.

In operation 615, the autonomous driving device may determine an expected meeting time with an external autonomous driving device. For example, the autonomous driving device may determine a time when it is expected to meet with the external autonomous driving device based on a driving path of the autonomous driving device, a driving speed of the autonomous driving device, a position of the external autonomous driving device, a movement path of the external autonomous driving device, and a movement speed of the external autonomous driving device.

In operation 620, the autonomous driving device may determine whether the expected meeting time is less than a specified time T. The autonomous driving device may perform operation 625, when the expected meeting time is less than the specified time, and may maintain the driving of the first driving path in operation 605, when the expected meeting time is greater than or equal to the specified time. For example, a description will be given assuming that the autonomous driving device and the external autonomous driving device are facing each other in the direction of each other to drive.

In operation 625, the autonomous driving device may determine whether it is possible to recognize information of the obstacle. For example, the autonomous driving device may determine whether the obstacle is an external autonomous driving device, information of which is registered in a DB. As an example, the autonomous driving device may determine whether the obstacle is an external autonomous driving device, related information of which is registered in the DB, based on an obstacle image captured using an image sensor (e.g., a camera) or an identification code of the obstacle, which is sensed using a sensor.

For example, Table 4 below is an example of information associated with a plurality of autonomous driving devices, which is registered in the DB. For example, the information associated with the plurality of autonomous driving devices, which is registered in the DB, may include information associated with of the autonomous driving device. For example, the autonomous driving device may be one of HR0003, HR0004, or KR0001 in Table 4 below. Types of autonomous driving devices, the number of the autonomous driving devices, and/or information of the autonomous driving devices, which are stored in the DB, are not limited to those described in Table 4 below.

TABLE 4

| Identification information | Manufacturer | Size, sensor configuration, and sensor margin (unit: mm) |
|---|---|---|
| HR0003 | H company | {width: 800, height: 1000, sensors: [3D LiDAR, 3D LiDAR, 3D camera], margin: 250, 250, 10} |
| HR0004 | H company | {width: 800, height: 900, sensors: [3D LiDAR, 3D LiDAR, 3D camera], margin: 150, 150, 15} |
| KR0001 | K company | {width: 600, height: 500, sensors: [2D LiDAR, 2D LiDAR], margin: 200, 200} |

Referring to Table 4 above, the information associated with the autonomous driving device may include identification information (e.g., a model number) of the autonomous driving device, manufacturer information of the autonomous driving device, size information of the autonomous driving device, sensor configuration information of the autonomous driving device, and sensor margin information of the autonomous driving device. For example, the autonomous driving device may determine whether the detected obstacle (e.g., the external autonomous driving device) is HR0003, HR0004, or KR0001.

The autonomous driving device may perform operation 630, when it is possible to recognize information of the obstacle (e.g., when the obstacle is HR0003, HR0004, or KR0001), and may perform operation 640, when it is impossible to recognize the information of the obstacle.

n operation 630, the autonomous driving device may search for a cross-driving rule corresponding to the obstacle (e.g., the external autonomous driving device). For example, storage of the autonomous driving device may store a cross-driving rule corresponding to an autonomous driving device registered in the DB. For example, the autonomous driving device may recognize the cross-driving rule corresponding to the recognized external autonomous driving device in the storage.

For example, Table 5 below indicates an example of the cross-driving rule stored in the storage. However, the cross-driving rule is not limited to those described in Table 5 below.

TABLE 5

| Identification information | HR0003 | HR0004 | KR0001 |
|---|---|---|---|
| HR0003 | Space sufficiency: drive right Space insufficiency: the one which first discovers it drives and the other moves to the right Cross-driving impossibility: manager notification | Space sufficiency: drive right Space insufficiency: HR0003 drives when it is possible for HR0003 to drive and HR0004 drives when it is possible for only HR0004 to drive Cross-driving impossibility: manager notification | Space sufficiency: drive right Space insufficiency: HR0003 drives when it is possible for HR0003 to drive and KR0001 drives when it is possible for only KR0001 to drive Cross-driving impossibility: manager notification |
| HR0004 | Space sufficiency: drive right Space insufficiency: HR0003 drives when it is possible for HR0003 to drive and HR0004 drives when it is possible for only HR0004 to drive Cross-driving impossibility: manager notification | Space sufficiency: drive right Space insufficiency: the one which first discovers it drives and the other moves to the right Cross-driving impossibility: manager notification | Space sufficiency: drive right Space sufficiency: KR0001 drives when it is possible for KR0001 to drive and HR0004 drives when it is possible for only HR0004 to drive Cross-driving impossibility: manager notification |
| KR0001 | Space sufficiency: drive right Space insufficiency: HR0003 drives when it is possible for HR0003 to drive | Space sufficiency: drive right Space insufficiency: KR0001 drives when it is possible for KR0001 to drive and HR0004 drives when it is possible for | Space sufficiency: drive right Space insufficiency: the one which first discovers it drives and the other moves to |

TABLE 5-continued

| Identification information | HR0003 | HR0004 | KR0001 |
|---|---|---|---|
| | and KR0001 drives when it is possible for only KR0001 to drive Cross-driving impossibility: manager notification | only HR0004 to drive Cross-driving impossibility: manager notification | the right Cross-driving impossibility: manager notification |

The cross-driving rule may indicate a rule for controlling driving when autonomous driving devices meet with each other. For example, because a criterion for determining space sufficiency, space insufficiency, or cross-driving impossibility is the same as that described in Table 2 above, it will be omitted.

The cross-driving rule may include a criterion (e.g., right driving) for avoidance driving when autonomous driving devices meet with each other. For example, referring to Table 5 above, when a space of the passage is sufficient, autonomous driving devices which drive in opposite directions may be configured to avoid each other to drive through right driving with respect to itself.

If the autonomous driving device and the external autonomous driving device are devices, each of which has the same type, and when the space of the passage is insufficient, at least one of the autonomous driving device or the external autonomous driving device may be configured such that a device which first detects a target between the autonomous driving device and the external autonomous driving device drives on the passage and such that the other device moves in one direction (e.g., to the right) in the passage to ensure a space to perform cross driving.

The cross-driving rule may include information indicating a priority of an autonomous driving device which precedes other autonomous driving devices when the autonomous driving devices meet with each other. For example, HR0003 may have a higher priority than HR0004 between HR0003 and HR0004. For example, when HR0003 and HR0004 meet with each other on the passage and the space is insufficient, HR0003 may be configured to drive on the passage when it is possible for HR0003 to drive and HR0004 may be configured to drive on the passage when it is possible for only HR0004 to drive.

In operation 635, the autonomous driving device may control driving based on the width of the passage and the found cross-driving rule. For example, the autonomous driving device may control driving based on the cross-driving rule described in operation 630.

For example, referring to Tables 4 and 5, when the autonomous driving device and the external autonomous driving device are devices, each of which has the same type (e.g., one of HR0003, HR0004, or KR0001) and the width of the passage is sufficient, each of the autonomous driving device and the external autonomous driving device may avoid each other through right driving to drive on the passage with respect to itself.

As another example, when the autonomous driving device and the external autonomous driving device are devices, each of which has the same type (e.g., one of HR0003, HR0004, or KR0001), and when the space of the passage is insufficient, a device which first detects a target between the autonomous driving device and the external autonomous driving device may drive on the passage and the other device may move in one direction (e.g., to the right) in the passage to ensure a driving space. The autonomous driving device and the external autonomous driving device may recognize a device which first detects a target (e.g., a device which first operates depending on the cross-driving rule) based on data sensed using a sensor or may recognize a device which first detects a target as the autonomous driving device which first detects the target delivers a signal for notifying the external autonomous driving device of it to the external autonomous driving device.

As another example, it is assumed that HR0003 and HR0004 meet with each other and the space of the passage is insufficient. When HR0003 slows down using one LiDAR sensor (or a sensor margin), there is a need for a space with a width greater than or equal to 1850 mm obtained by adding a width of 800 mm in HR0003, a sensor margin of 250 mm in HR0003, and a width of 800 mm in HR0004. When HR0004 slows down using only one LiDAR sensor (or a sensor margin), there is a need for a space with a width greater than or equal to 1750 mm obtained by adding a width of 800 mm in HR0004, a sensor margin of 150 mm in HR0004, and a width of 800 mm in HR0003. Both of HR0003 and HR0004 are able to drive on the passage when the width of the space of the passage is greater than 1850 mm. However, HR0003 may drive on the passage in priority and HR0004 may move to a right edge of the passage to form a space through which HR0003 is able to pass. Because HR0003 is unable to drive on the passage and only HR0004 is able to drive on the passage when the width of the space of the passage is 1800 mm, HR0003 ma move to the right edge of the passage to form a space through which HR0004 is able to pass and HR0004 may drive on the passage. Likewise, referring to Table 5 above, HR0003 may have a higher priority than KR0001 between HR0003 and KR0001 to drive on the passage and KR0001 may have a higher priority than HR0004 between HR0004 and KR0001 to drive on the passage.

If it is determined that it is impossible to perform cross driving in the width of the space of the passage, the autonomous driving device may be configured to notify an external device (e.g., a manager device or a control server) that it is impossible to perform cross driving. The autonomous driving device may be configured to, when it is impossible to perform cross driving, stop driving and navigate another driving path for reaching a destination.

In operation 640, the autonomous driving device may recognize a size and motion of the obstacle. For example, the autonomous driving device may recognize a size of the obstacle, a movement direction of the obstacle, and a movement speed of the obstacle using at least one sensor. The autonomous driving device may determine a time point when the autonomous driving device meets with the obstacle based on the size and motion of the obstacle.

In operation 645, the autonomous driving device may determine a passage space expected at a time point when the autonomous driving device meets with the obstacle. For example, the autonomous driving device may calculate a width of an unobstructed space based on a width of the passage, a size of the obstacle, and a position of the obstacle in the passage, which is expected at the time point when the autonomous driving device meets with the obstacle.

In operation 650, the autonomous driving device may control driving based on the determined passage space. For example, when the width of the determined passage space is greater than a "minimum drivable width", the autonomous driving device may avoid the obstacle to pass through the passage at a speed where the autonomous driving device is previously driving. When the width of the determined passage space is less than or equal to the "minimum drivable width" and is greater than a "a minimum width capable of slowing down", the autonomous driving device may decrease the driving speed and may avoid the obstacle to pass through the passage. When the width of the determined passage space is less than or equal to the "minimum width capable of slowing down", the autonomous driving device may navigate a new driving path for reaching the destination except for the path where the obstacle is present or may stop driving.

Figure 7:
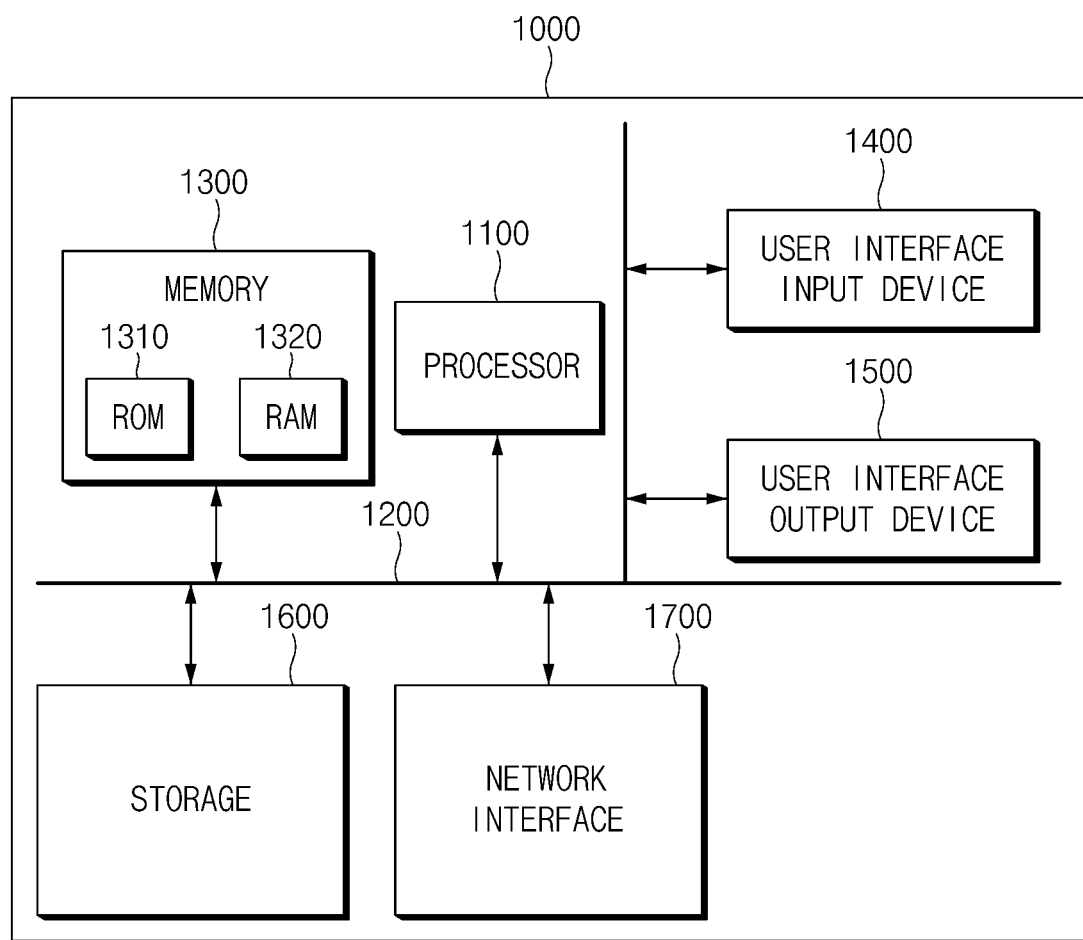
FIG. 7 illustrates a computing system.

FIG. 7 illustrates a computing system.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the one or more example embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The autonomous driving device and the driving control method thereof may determine a path for avoiding an obstacle to move to a destination based on the obstacle and a situation, when detecting the obstacle on a movement path.

The autonomous driving device and the driving control method thereof may correct a movement path (e.g., a passage) to perform cross driving with an autonomously movable object detected by the autonomous driving device, when detecting the autonomously movable obstacle on the movement path, and may perform cross driving with the obstacle along the corrected movement path.

The autonomous driving device and the driving control method thereof may recognize or determine an avoidance policy capable of performing cross driving to pass through the passage, based on information of an external autonomous driving device, when it is expected to collide with the external autonomous driving device on the passage on the movement path, and may perform cross driving on the passage with the external autonomous driving device based on the avoidance policy.

In addition, various effects ascertained directly or indirectly through the present disclosure may be provided.

Hereinabove, although the present disclosure has been described with reference to example embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the example embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A first autonomous driving device comprising:
    at least one sensor;
    a processor; and
    storage comprising a database, wherein the database stores information about a plurality of autonomous driving devices,
    wherein the processor is configured to:
        detect, using the at least one sensor, an obstacle that is present on a passage in a first driving path, of the first autonomous driving device, to a destination;
        determine whether there is a need for the first autonomous driving device to cross paths with the obstacle to pass through the passage;
        determine, based on the need, a time to collision by the first autonomous driving device with the obstacle;
        determine, based on a determination that the time to collision is less than a threshold time, whether the obstacle is a second autonomous driving device associated with the information stored in the database;
        identify, based on the obstacle being the second autonomous driving device associated with the information, a driving rule corresponding to the second autonomous driving device, the driving rule being stored in the storage;
        determine, based on the driving rule, a second driving path for passing through the passage; and
        control the first autonomous driving device to drive on the passage along the second driving path.

2. The first autonomous driving device of claim 1, wherein the at least one sensor comprises at least one of: an image sensor or a light detection and ranging (LiDAR) sensor.

3. The first autonomous driving device of claim 1, wherein the plurality of autonomous driving devices comprises the first autonomous driving device and the second autonomous driving device, and wherein the driving rule comprises one or more criteria for determining an autonomous driving device of the plurality of autonomous driving devices to drive along the passage and an autonomous driving device of the plurality of autonomous driving devices to move to an edge of the passage, based on at least one of: a width of the passage, a size of each of the first autonomous driving device and the second autonomous driving device, a sensor configuration, or a measurement range of a sensor.

4. The first autonomous driving device of claim 1, wherein the information about the plurality of autonomous driving devices comprises at least one of: identification information about each of the plurality of autonomous driving devices, manufacturer information about each of the plurality of autonomous driving devices, size information about each of the plurality of autonomous driving devices, information about a configuration of a sensor included in each of the plurality of autonomous driving devices, or information about a measurement range of a predetermined sensor.

5. The first autonomous driving device of claim 1, wherein the processor is configured to determine whether the obstacle is the second autonomous driving device by:
   analyzing an image corresponding to the obstacle, the image being obtained using the at least one sensor; and
   determining, based on the analyzed image, whether the obstacle is the second autonomous driving device.

6. The first autonomous driving device of claim 1, wherein the processor is further configured to:
   determine, using the at least one sensor, whether there is a person around the obstacle, based on the obstacle not being the second autonomous driving device associated with the information stored in the database;
   output, based on the person being around the obstacle, an alert to notify that the obstacle is present;
   determine a third driving path following one edge of the passage; and
   control the first autonomous driving device to drive on the passage along the third driving path.

7. The first autonomous driving device of claim 6, wherein the processor is further configured to, based on a determination that no person is around the obstacle, determine a fourth driving path which does not include the passage and control the first autonomous driving device to drive along the fourth driving path.

8. The first autonomous driving device of claim 1, wherein the processor is further configured to:
   determine, based on a size and a position of the obstacle, a width of an unobstructed space on the passage at a location where the first autonomous driving device is expected to cross paths with the obstacle;
   maintain a driving speed of the first autonomous driving device at a predetermined first speed, based on the width of the unobstructed space being greater than a first reference value;
   decrease the driving speed of the first autonomous driving device to a second predetermined speed lower than the predetermined first speed, based on the width of the unobstructed space being less than or equal to the first reference value and being greater than a second reference value; and
   determine another driving path that does not pass through the passage, based on the width of the unobstructed space being less than or equal to the second reference value.

9. The first autonomous driving device of claim 8, wherein the processor is further configured to determine the first reference value and the second reference value based on information about a size of the first autonomous driving device and a measurement range of the at least one sensor.

10. The first autonomous driving device of claim 1, further comprising:
   a communication circuit,
   wherein the processor is further configured to:
      receive, from an external device associated with the first autonomous driving device and through the communication circuit, the information about the plurality of autonomous driving devices or information about an additional autonomous driving device; and
      update the database and the driving rule based on the information about the plurality of autonomous driving devices or the information about the additional autonomous driving device.

11. The first autonomous driving device of claim 10, wherein the processor is further configured to transmit, through the communication circuit, a message indicating that it is impossible to pass through the passage due to the obstacle or that it is unable to find a path for reaching the destination.

12. A driving control method comprising:
   detecting, using at least one sensor of a first autonomous driving device, an obstacle that is present on a passage in a first driving path, of the first autonomous driving device, to a destination;
   determine whether there is a need for the first autonomous driving device to cross paths with the obstacle to pass through the passage;
   determining, based on the need, a time to collision by the first autonomous driving device with the obstacle;
   determining, based on a determination that the time to collision is less than a threshold time, whether the obstacle is a second autonomous driving device associated with information, about a plurality of autonomous driving devices, stored in a database;
   identifying, based on the obstacle being the second autonomous driving device associated with the information, a driving rule corresponding to the second autonomous driving device, the driving rule being stored in storage of the first autonomous driving device;
   determining, based on the driving rule, a second driving path for passing through the passage; and
   controlling the first autonomous driving device to drive on the passage along the second driving path.

13. The driving control method of claim 12, wherein the plurality of autonomous driving devices comprises the first autonomous driving device and the second autonomous driving device, and wherein the driving rule comprises one or more criteria for determining an autonomous driving device of the plurality of autonomous driving devices to drive along the passage and an autonomous driving device of the plurality of autonomous driving devices to move to an edge of the passage, based on at least one of: a width of the passage, a size of each of the first autonomous driving device and the second autonomous driving device, a sensor configuration, or a measurement range of a sensor.

14. The driving control method of claim 12, wherein the information about the plurality of autonomous driving devices comprises at least one of: identification information about each of the plurality of autonomous driving devices, manufacturer information about each of the plurality of autonomous driving devices, size information about each of the plurality of autonomous driving devices, information about a configuration of a sensor included in each of the plurality of autonomous driving devices, or information about a measurement range of a predetermined sensor.

15. The driving control method of claim 12, wherein the determining of whether the obstacle is the second autonomous driving device comprises:
   analyzing an image corresponding to the obstacle, the image being obtained using the at least one sensor; and
   determining, based on the analyzed image, whether the obstacle is the second autonomous driving device.

16. The driving control method of claim 12, further comprising:
   determining, using the at least one sensor, whether there is a person around the obstacle, based on the obstacle being not being the second autonomous driving device associated with the information stored in the database;
   outputting, based on the person being around the obstacle, an alert to notify that the obstacle is present;
   determining a third driving path following one edge of the passage; and
   controlling the first autonomous driving device to drive on the passage along the third driving path.

17. The driving control method of claim 12, further comprising:
   determining, using the at least one sensor, whether there is a person around the obstacle, based on the obstacle not being the second autonomous driving device associated with the information stored in the database;
   based on a determination that no person is around the obstacle, determining a fourth driving path which does not include the passage; and
   controlling the first autonomous driving device to drive along the fourth driving path.

18. The driving control method of claim 12, further comprising:
   determining, based on a size and a position of the obstacle, a width of an unobstructed space on the passage at a location where the first autonomous driving device is expected to cross paths with the obstacle; and
   performing one of:
      maintaining a driving speed of the first autonomous driving device at a predetermined first speed, based on the width of the unobstructed space being greater than a first reference value;
      decreasing the driving speed of the first autonomous driving device to a second predetermined speed lower than the first predetermined speed, based on the width of the unobstructed space being less than or equal to the first reference value and being greater than a second reference value; or
      determining another driving path that does not pass through the passage, based on the width of the unobstructed space being less than or equal to the second reference value.

19. The driving control method of claim 18, further comprising:
   determining the first reference value and the second reference value based on information about a size of the first autonomous driving device and a measurement range of the at least one sensor.

20. The driving control method of claim 12, further comprising:
   receiving, from an external device associated with the first autonomous driving device, the information about the plurality of autonomous driving devices or information about an additional autonomous driving device; and
   updating the database and the driving rule based on the information about the plurality of autonomous driving devices or the information about the additional autonomous driving device.

* * * * *